Patented June 13, 1939

2,162,627

UNITED STATES PATENT OFFICE 2,162,627

ALLOY

Alpine R. MacGregor, Forest Hills, Pa.

No Drawing. Application December 2, 1937,
Serial No. 177,821

1 Claim. (Cl. 75—153)

This invention relates to welding, brazing or soldering and to alloys useful therefor. It relates especially to copper base alloys having compositions which make them exceptionally suitable for welding, brazing and similar applications, and having valuable characteristics for such applications.

Numerous attempts have been made heretofore to improve the properties of copper for welding, and more specifically to produce improved copper-base rods and wire for use in welding, soldering, and like operations. For this purpose it has been proposed to add varying amounts of phosphorus to the copper. It has also been proposed to add both silver and phosphorus to the copper, and two different types of alloy systems consisting of these three constituents have been suggested. In one type relatively large amounts of silver, such as 10 per cent to 25 per cent, are used with much smaller amounts of phosphorus to modify the copper base; and in the other type small amounts of silver are used with similar small amounts of phosphorus as additions.

The high-silver type of alloy is satisfactory in some respects, but is not as fluid at temperatures near its melting point as is desired for some purposes, and in addition produces a dark-colored weld which is objectionable in some circumstances. It is also, necessarily, quite expensive. The low silver and low phosphorus alloy also lacks fluidity and generally has a rather coarse structure, especially in the as-cast condition, which impairs its utility for many applications.

I have now found that the undesirable features of previously proposed copper-phosphorus-silver solders and welding alloys are not encountered with alloys having a silver content of about 1 to 3 per cent and a higher phosphorus content of about 7 to 8.5 per cent, with the balance substantially copper. An especially desirable composition contains about 2 per cent silver and 7.5 or 8 per cent phosphorus. Such compositions are easily made up and cast, and easily rolled from cast bars, etc., into the form of small rods or strips or wire.

A distinct advantage results from the high fluidity of my new alloy at relatively low temperatures. It may be readily demonstrated that the fluidity of this alloy is higher, and its melting point or temperature of application lower, than with previously proposed silver-phosphorus-copper alloys for this purpose. Another advantage is the very fine crystal structure, which seems to be peculiar to alloys of this system having silver contents between 1 and 3 per cent. With lower and higher silver contents the crystal structure rapidly becomes coarser. A further advantage is the light color and clean appearance of welded or soldered joints formed with alloys of this composition.

While the best results are obtained when the silver content is between 1 and 3 per cent and the phosphorus content is between 7 and 8.5 per cent—and preferably between 7.5 and 8 per cent—a wider range of phosphorus contents produces useful results. For example, phosphorus contents as high as 9 per cent and as low as 6 or even 5 per cent, with silver contents of 1 to 3 per cent, are useful in copper base welding alloys, but the fluidity and penetrating effect of the alloy decrease as compared with alloys having the preferred composition.

All of the alloys within the stated composition limits produce strong welds, but are sufficiently ductile to be readily peened or dressed. Furthermore, because of their relatively low silver content they can be produced at a cost which is not prohibitive.

The application of these alloys is simply and easily effected with any of the ordinarily employed welding, brazing or soldering methods. Articles or edges to be joined are positioned adjacent one another and my alloy is supplied to the joint in molten condition, with or without use of a flux. After solidification of the alloy a strong joint is produced, substantially free from scale and requiring little or no dressing. The alloys of the above stated composition can be used with good results in joining substantially all of the commercially useful metals, as well as for brazing and filling.

My invention has been described hereinabove with special reference to certain practices and embodiments which are now considered advantageous, but may be otherwise embodied and practiced within the scope of the appended claim.

I claim:

An alloy comprising 7 to 8.5 per cent phosphorus, 1 to 3 per cent silver, and the balance substantially all copper amounting to 88 to 92 per cent, said alloy being characterized by high fluidity at temperatures near its melting point, and by fine crystal structure and light color in the as-cast condition.

ALPINE R. MacGREGOR.